P. H. BLAZER.
WAGON BRAKE ACTUATING MECHANISM.
APPLICATION FILED OCT. 26, 1914.
1,165,648.
Patented Dec. 28, 1915.
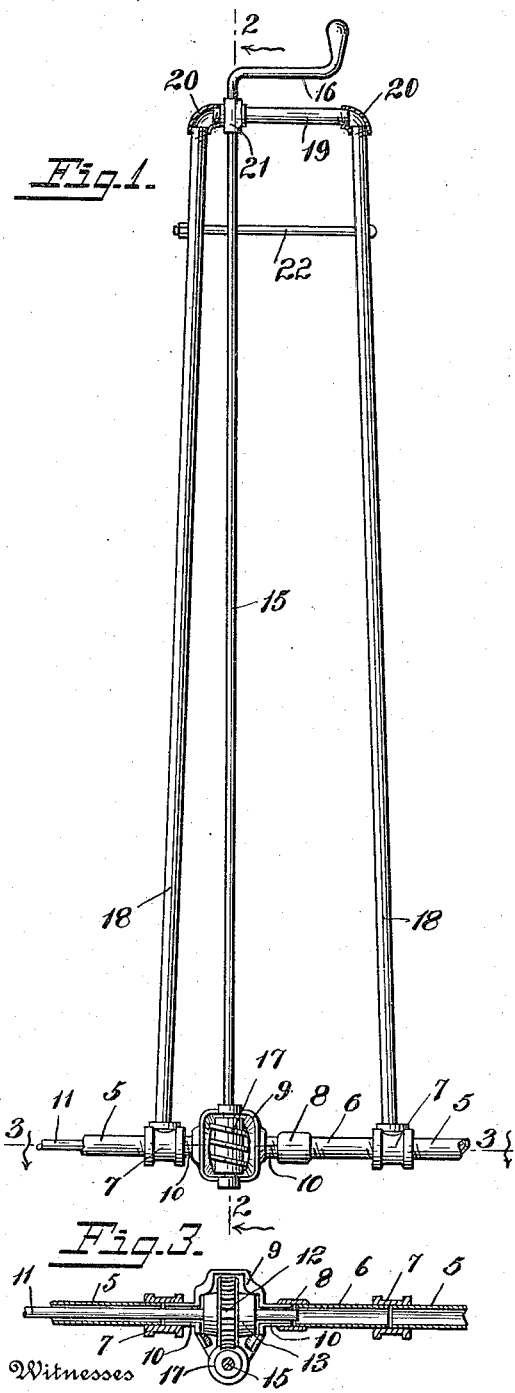
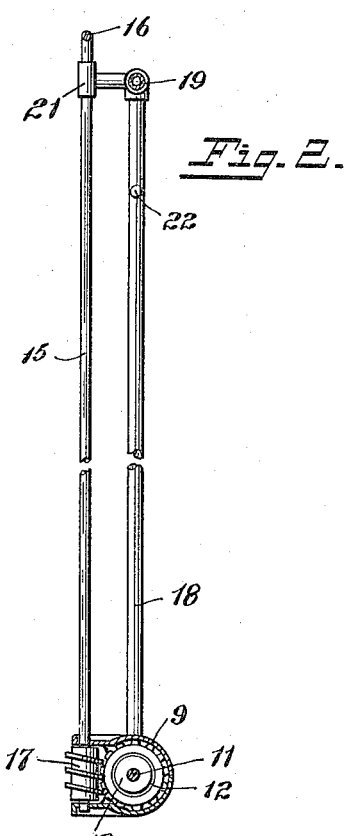
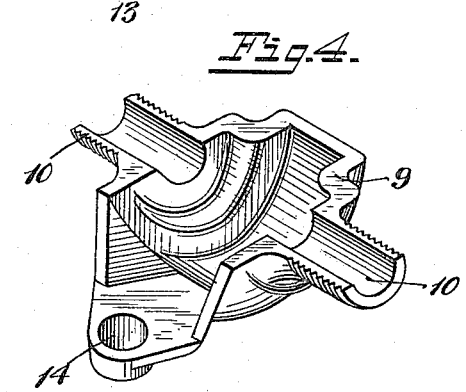
Inventor
P. H. Blazer

UNITED STATES PATENT OFFICE.

PHILIP H. BLAZER, OF MINERVA, OHIO.

WAGON-BRAKE-ACTUATING MECHANISM.

1,165,648.  Specification of Letters Patent.  Patented Dec. 28, 1915.

Application filed October 26, 1914. Serial No. 868,747.

*To all whom it may concern:*

Be it known that I, PHILIP H. BLAZER, a citizen of the United States, residing at Minerva, in the county of Stark, State of Ohio, have invented certain new and useful Improvements in Wagon-Brake-Actuating Mechanism; and I do hereby declare the following to be a full, clear, and exact description of the invention, such as will enable others skilled in the art to which it appertains to make and use the same.

This invention relates to wagon brakes, and it more particularly relates to an improved form of brake-actuating mechanism adapted to be employed in connection with hay frames, etc.

An object of the invention is to provide an improved and thoroughly practical and efficient brake-actuating mechanism in combination with the front standard or yoke of a hay frame.

Another object of the invention is to provide an improved mechanism of this character which is built up principally from ordinary mercantile stock of pipe and pipe couplings, so as to reduce the cost of manufacture, and at the same time to provide a strong, rigid, durable and thoroughly efficient device of this character, at a moderate cost.

Other objects and advantages may be recited hereinafter and in the claim.

In the accompanying drawings, which supplement this specification: Figure 1 is an elevation view of the front standard or yoke of a hay frame constructed in accordance with my invention and including my improved brake-actuating mechanism. Fig. 2 is a vertical sectional view on the line 2—2 of Fig. 1. Fig. 3 is a horizontal sectional view on the line 3—3 of Fig. 1, and Fig. 4 is a perspective view of one of the two counterpart castings which constitute the gear casing.

Referring to these drawings, in which similar reference characters correspond with similar parts, throughout the several views, the body or base of the structure consists of the pipe sections 5 and 6, two T-couplings 7, a sleeve connection or coupling 8, and the gear casing 9. This gear casing comprises two counterpart castings, such as illustrated in Fig. 4, each being provided with two oppositely extending semi-cylindrical bosses or projections 10, so that when the counterpart castings are fitted together, the respective bosses 10 thereof unite to form two oppositely extending threaded cylinders or pipe connections which engage with the couplings 7 and 8 respectively. A brake-actuating axle 11 extends into the casing through one of the elements 5 and one of the connections 7, and carries a worm gear wheel 12 on its inner end portion, said worm gear wheel being provided with oppositely disposed bosses 13, which constitute journals which have their bearings in the opposite ends of the casing. Each of the casing sections is provided with an aperture 14, in vertical alinement and constituting bearings for a vertical rod or crank shaft 15 having a crank handle 16 on its upper end. A worm 17 is secured on the lower end of the rod 15, and is seated between the upper and lower sections of the casing 9, being in mesh with the gear wheel 15.

Extending upward from the T-connections 7 are a pair of yoke elements or substantially vertical pipe sections 18 having their upper ends connected by means of a pipe section 19 and two L-connections 20. Any suitable form of bearing element 21 is mounted on the pipe section 19, and the rod 15 is journaled therein. The pipe section 19 is preferably provided with right-hand and left-hand threads, while the L-connections 20 are correspondingly threaded, so that said pipe section 19 may be screwed into both of said L-connections at the same time.

A bolt or other suitable brace element 22 is secured to the pipe sections 18 below and substantially parallel with the section 19, so that a tie-pole (not shown) may be inserted either under and in contact with the section 19 or the element 22.

The rotatable shaft or axle 11 may be connected in any suitable way with any usual or preferred brake mechanism for actuating the latter.

From the foregoing, it will be seen that when a hay frame is equipped with my improved brake-actuating mechanism, when said frame is loaded, the driver may sit upon the load adjacent to the crank lever 16 and regulate the brake to suit the attending circumstances.

It will be seen that I have provided a brake-actuating mechanism of this character which is fully capable of attaining the foregoing objects in a thoroughly practical and efficient manner.

I do not limit my invention to the exact details of construction, combination and arrangement of parts, as herewith illustrated and described, but my invention may only be limited by a reasonable interpretation of the claim.

I claim:

A power transmission mechanism comprising a gear casing including two sections, each section having oppositely extending semi-cylindrical and externally threaded members, a support, internally threaded sleeves carried thereby and embracing the semi-cylindrical members of the casing sections, a transverse shaft in the casing and extending into the support, each of the casing sections having an apertured extension from one side, a pinion carried by the shaft, said extensions being disposed in alinement, a shaft rotatably mounted in the extensions, and a gear carried by the shaft within the casing and meshing with the said pinion.

In testimony whereof, I affix my signature, in the presence of two witnesses.

PHILIP H. BLAZER.

Witnesses:
JOSEPH K. ALEXANDER,
JOHN C. HORN.

Copies of this patent may be obtained for five cents each, by addressing the "Commissioner of Patents, Washington, D. C."